United States Patent
Suzuki

(10) Patent No.: US 12,000,327 B2
(45) Date of Patent: Jun. 4, 2024

(54) GRILLE SHUTTER CONTROL DEVICE

(71) Applicant: ISUZU MOTORS LIMITED, Tokyo (JP)

(72) Inventor: Kazuhiro Suzuki, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 183 days.

(21) Appl. No.: 17/437,913

(22) PCT Filed: Mar. 13, 2020

(86) PCT No.: PCT/JP2020/011028
§ 371 (c)(1),
(2) Date: Sep. 10, 2021

(87) PCT Pub. No.: WO2020/184701
PCT Pub. Date: Sep. 17, 2020

(65) Prior Publication Data
US 2022/0145793 A1    May 12, 2022

(30) Foreign Application Priority Data
Mar. 13, 2019    (JP) .................. 2019-046467

(51) Int. Cl.
*F01P 7/00*    (2006.01)
*B60K 11/08*    (2006.01)
*F01P 7/10*    (2006.01)

(52) U.S. Cl.
CPC .............. *F01P 7/10* (2013.01); *B60K 11/085* (2013.01); *F01P 2025/13* (2013.01); *F01P 2025/32* (2013.01); *F01P 2025/60* (2013.01)

(58) Field of Classification Search
CPC ...... F01P 7/10; F01P 2015/13; F01P 2025/32; B60K 11/085

(Continued)

(56) References Cited

U.S. PATENT DOCUMENTS 2,105,193 A * 1/1938 Kysor ............... F01P 7/16
    236/86
8,571,749 B2 * 10/2013 Kawato ............ B60K 11/085
    701/29.2
(Continued)

FOREIGN PATENT DOCUMENTS

CN    203995654 U    12/2014
CN    107000574 A    8/2017
(Continued)

OTHER PUBLICATIONS

International Search Report from International Application No. PCT/JP2020/011028, dated May 26, 2020.

*Primary Examiner* — Hau V Phan
(74) *Attorney, Agent, or Firm* — Shih IP Law Group, PLLC

(57) ABSTRACT

This grille shutter control device controls opening and closing of a grille shutter, taking into account not only the cooling performance of a vehicle, but also other performance aspects. The grille shutter control device is a grille shutter control device for controlling opening and closing of a grille shutter in a vehicle equipped with an internal combustion engine, wherein a control device includes: a logic selecting unit for selecting one logic from among a plurality of opening degree determining logics for determining an opening degree of a grille shutter, on the basis of an atmospheric temperature inside an exhaust pipe (K1) of an engine; and a logic executing unit for controlling opening and closing of the grille shutter by executing the one logic selected by the logic selecting unit.

4 Claims, 4 Drawing Sheets

(58) Field of Classification Search
USPC .......................................................... 180/68.1
See application file for complete search history.

(56) References Cited

U.S. PATENT DOCUMENTS

| | | | | |
|---|---|---|---|---|
| 10,329,995 | B1* | 6/2019 | Larose, Jr. | ............. F02M 31/20 |
| 2010/0147611 | A1* | 6/2010 | Amano | ..................... F01P 7/12 |
| | | | | 180/68.1 |
| 2012/0012410 | A1* | 1/2012 | Hori | ..................... B60K 11/085 |
| | | | | 180/68.1 |
| 2012/0181001 | A1* | 7/2012 | Marsh | ....................... F01P 3/20 |
| | | | | 165/185 |
| 2014/0039765 | A1* | 2/2014 | Charnesky | ........... B60K 11/085 |
| | | | | 701/49 |
| 2014/0290599 | A1* | 10/2014 | Numata | .................... F01P 7/12 |
| | | | | 123/41.05 |
| 2015/0217633 | A1* | 8/2015 | Huijzers | .............. B60K 11/085 |
| | | | | 454/145 |
| 2015/0343894 | A1* | 12/2015 | Yoshioka | ............. B60K 11/085 |
| | | | | 180/68.1 |
| 2016/0108837 | A1* | 4/2016 | Sugimoto | ........... F02D 41/0235 |
| | | | | 60/299 |
| 2017/0210221 | A1* | 7/2017 | Ogura | ................. B60K 11/085 |
| 2018/0086198 | A1 | 3/2018 | Maeda | |
| 2019/0272687 | A1* | 9/2019 | Dudar | ..................... F01P 5/043 |

FOREIGN PATENT DOCUMENTS

| | | |
|---|---|---|
| JP | 2016-190533 A | 11/2016 |
| JP | 2017007516 A | 1/2017 |
| JP | 2018-030429 A | 3/2018 |
| JP | 2018-167832 A | 11/2018 |
| KR | 10-2016-0036930 A | 4/2016 |

* cited by examiner

GRILLE SHUTTER CONTROL DEVICE

TECHNICAL FIELD

The present disclosure relates to a grille-shutter control apparatus for controlling opening and closing of a grille shutter of a vehicle in which an internal combustion engine is mounted.

BACKGROUND ART

Conventionally, a vehicle is known in which a grille shutter is mounted that adjusts the air volume of a wind caused during traveling that is taken into an engine room housing heat exchangers such as an air conditioner condenser, an intercooler, and a radiator of the vehicle (see e.g., Patent Literature (hereinafter referred to as "PTL") 1.). Such a grille shutter is disposed on a front opening portion of the engine room of the vehicle, and the opening degree is controlled based on the water temperature or the like of cooling water for cooling the internal combustion engine.

CITATION LIST

Patent Literature

PTL 1

Japanese Patent Application Laid-Open No. 2018-167832

SUMMARY OF INVENTION

Technical Problem

However, conventionally, the grille shutter is intended to be opened and closed in consideration of the cooling performance of the internal combustion engine of the vehicle. There is room for improvement in controlling the opening and closing of the grille shutter in consideration of performance other than the cooling performance.

An object of the present disclosure is to provide a grille-shutter control apparatus capable of controlling opening and closing of a grille shutter in consideration of performance other than the cooling performance of an internal combustion engine of a vehicle.

Solution to Problem

A grille-shutter control apparatus according to the present disclosure is a grille-shutter control apparatus that controls opening and closing of a grille shutter of a vehicle in which an internal combustion engine is mounted, and includes: a logic selection section that selects one logic from among a plurality of opening-degree determination logics based on a temperature of an atmosphere inside an exhaust pipe of the internal combustion engine, the plurality of opening-degree determination logics being for determining an opening degree of the grille shutter; and a logic execution section that controls the opening and closing of the grille shutter by executing the one logic selected by the logic selection section.

Advantageous Effects of Invention

According to the present disclosure, it is possible to control the opening and closing of the grille shutter in consideration of performance other than the cooling performance of the vehicle.

DESCRIPTION OF EMBODIMENTS

An embodiment of the present disclosure will be described in detail below with appropriate reference to the accompanying drawings.

<Configuration of Engine Room of Vehicle>

Figure 1:
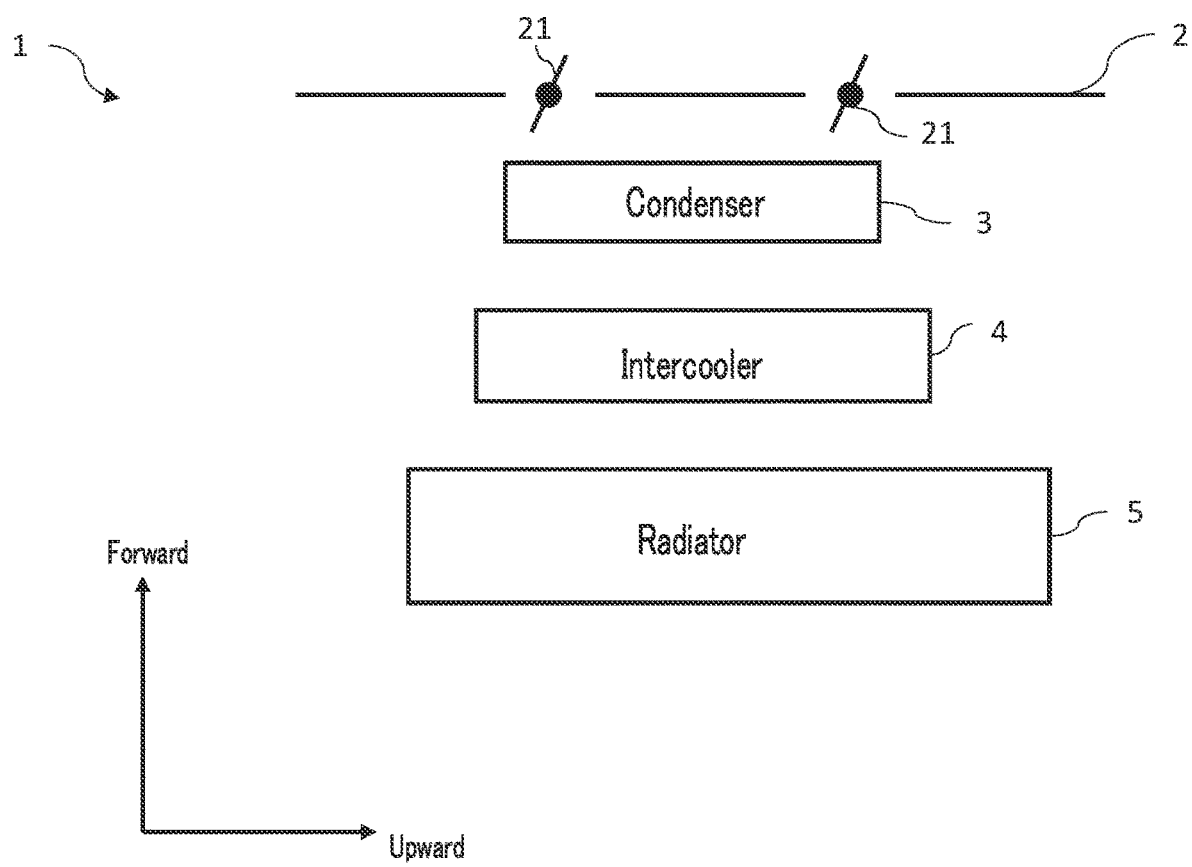
FIG. 1 schematically illustrates a configuration of an engine room of a vehicle in which grille shutters controlled by a grille-shutter control apparatus according to an embodiment of the present disclosure are mounted.

A configuration of an engine room of a vehicle in which a grille-shutter control apparatus according to an embodiment of the present disclosure is mounted will be described in detail below with reference to FIG. 1.

Engine room 1 of the vehicle in which the grille-shutter control apparatus according to the present embodiment is mounted includes grille 2, condenser 3, intercooler 4, and radiator 5.

Front grille 2 is disposed on a foremost portion of the engine room of the vehicle, and has a configuration through which a wind being caused during travelling can pass from the front to the rear. Front grille 2 is provided with openable/closable grille shutters 21.

Condenser 3 is disposed on a circulation path of a refrigerant of an air conditioner (not illustrated), and cools the refrigerant.

Intercooler 4 cools the air compressed by a turbocharger described later and delivers the air to the internal combustion engine.

Radiator 5 is disposed in a circulation path of cooling water of the internal combustion engine, and cools the cooling water having absorbed heat from the internal combustion engine.

<Configuration of Vehicle>

Figure 2:
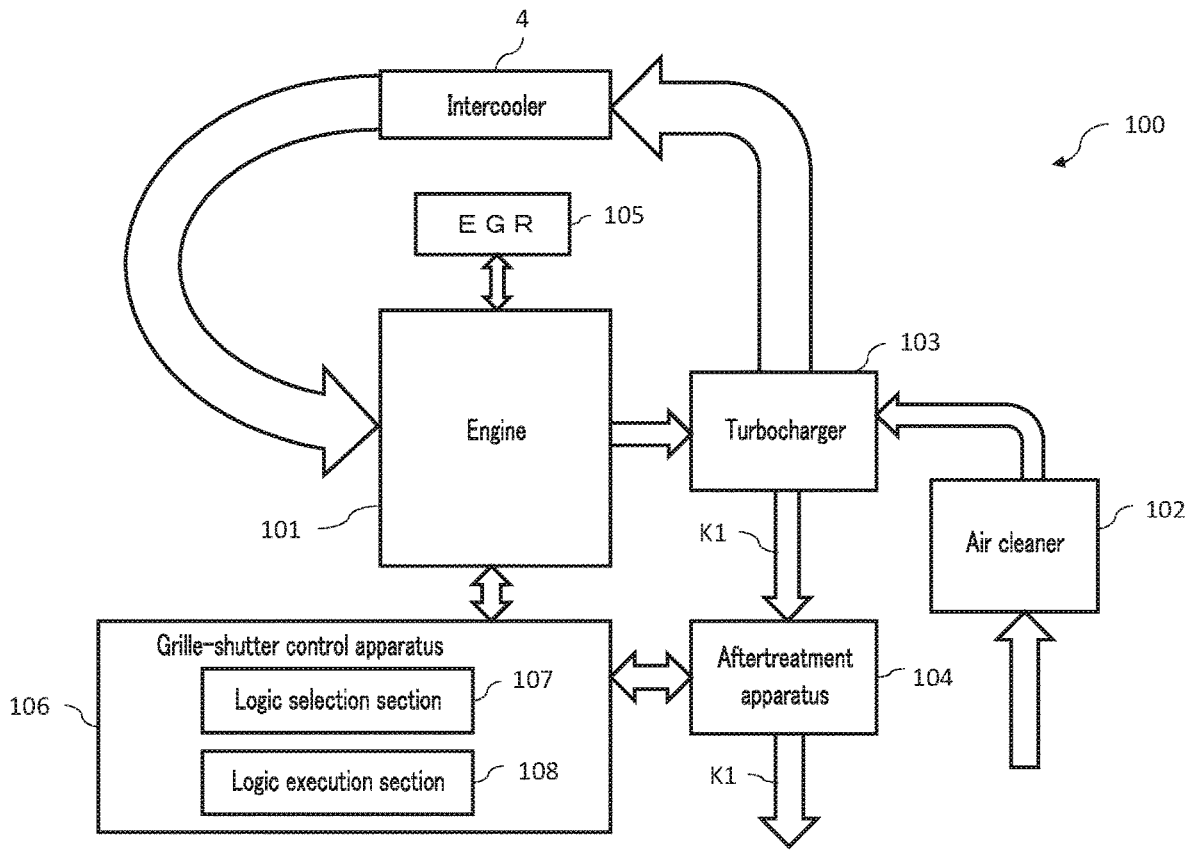
FIG. 2 schematically illustrates a configuration of the vehicle including the grille-shutter control apparatus according to an embodiment of the present disclosure.

The configuration of vehicle 100 according to the embodiment of the present disclosure will be described in detail below with reference to FIG. 2.

Vehicle 100 includes intercooler 4, engine 101, air cleaner 102, turbocharger 103, aftertreatment apparatus 104, EGR apparatus 105, and grille-shutter control apparatus 106.

Engine 101 is the internal combustion engine. Engine 101 takes air therein from intercooler 4 and burns a mixture of fuel injected from a fuel injection valve (not illustrated) and the air taken in from intercooler 4, thereby driving the vehicle by the driving force generated.

Air cleaner 102 takes in outside air, removes dust or the like contained in the outside air taken in, and delivers, to turbocharger 103, the outside air from which the dust or the like is removed.

Turbocharger 103 drives a compressor (not illustrated) by an exhaust gas of engine 101 and delivers the exhaust gas to aftertreatment apparatus 104. Turbocharger 103 compresses the air delivered by the compressor from air cleaner 102 and delivers the air to intercooler 4.

Aftertreatment apparatus 104 is disposed in exhaust pipe K1 and is provided with an oxidation catalyst, a filter, an SCR catalyst, or the like. Aftertreatment apparatus 104 purifies the exhaust gas from turbocharger 103 with the filter or the catalyst and discharges the exhaust gas to the outside.

EGR apparatus 105 recirculates part of the exhaust gas of engine 101 to engine 101.

Grille-shutter control apparatus 106 includes an electronic control apparatus such as an Electronic Control Unit (ECU), and operates by executing control programs stored in a memory (not illustrated). Grille-shutter control apparatus 106 controls the opening and closing of grille shutters 21 based on the temperature of an atmosphere in exhaust pipe K1 detected by a temperature sensor disposed in aftertreatment apparatus 104.

Specifically, grille-shutter control apparatus 106 includes logic selection section 107 and logic execution section 108 as functional blocks. Logic selection section 107 obtains the temperature of the atmosphere inside exhaust pipe K1 based on a detection result of detection by the sensor that is disposed in aftertreatment apparatus 104 and that measures the temperature of the exhaust gas or catalyst. Based on the temperature of the atmosphere inside exhaust pipe K1 obtained, logic selection section 107 selects one logic from among a plurality of opening-degree determination logics for determining the opening degree of grille shutters 21. Logic execution section 108 controls the opening and closing of grille shutters 21 by executing one logic selected by logic selection section 107.

<Operation of Grille-Shutter Control Apparatus>

Figure 3:
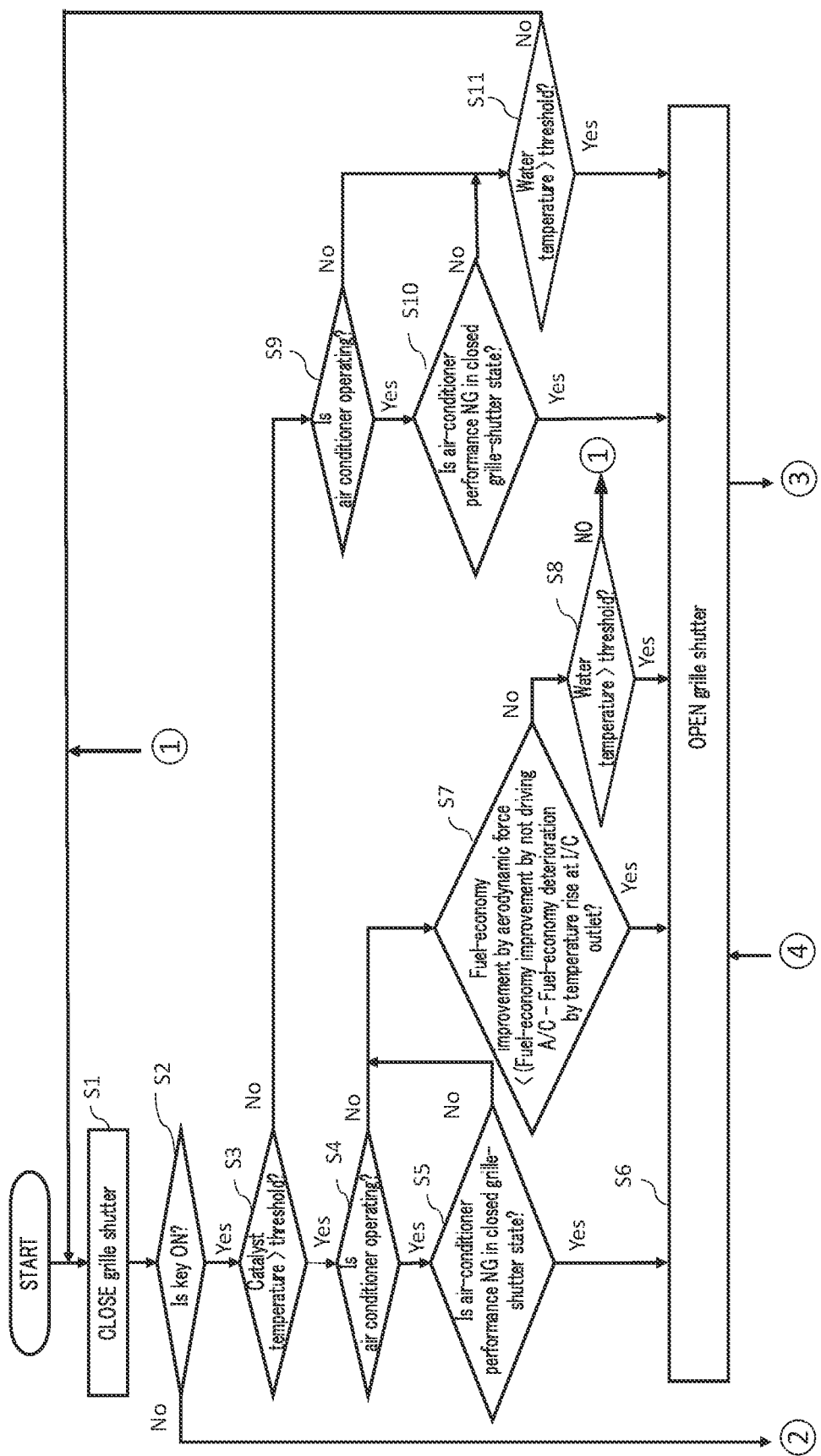
FIG. 3 is a flow diagram illustrating the operation of the grille-shutter control apparatus according to an embodiment of the present disclosure in a case where the grille shutters are closed.
Figure 4:
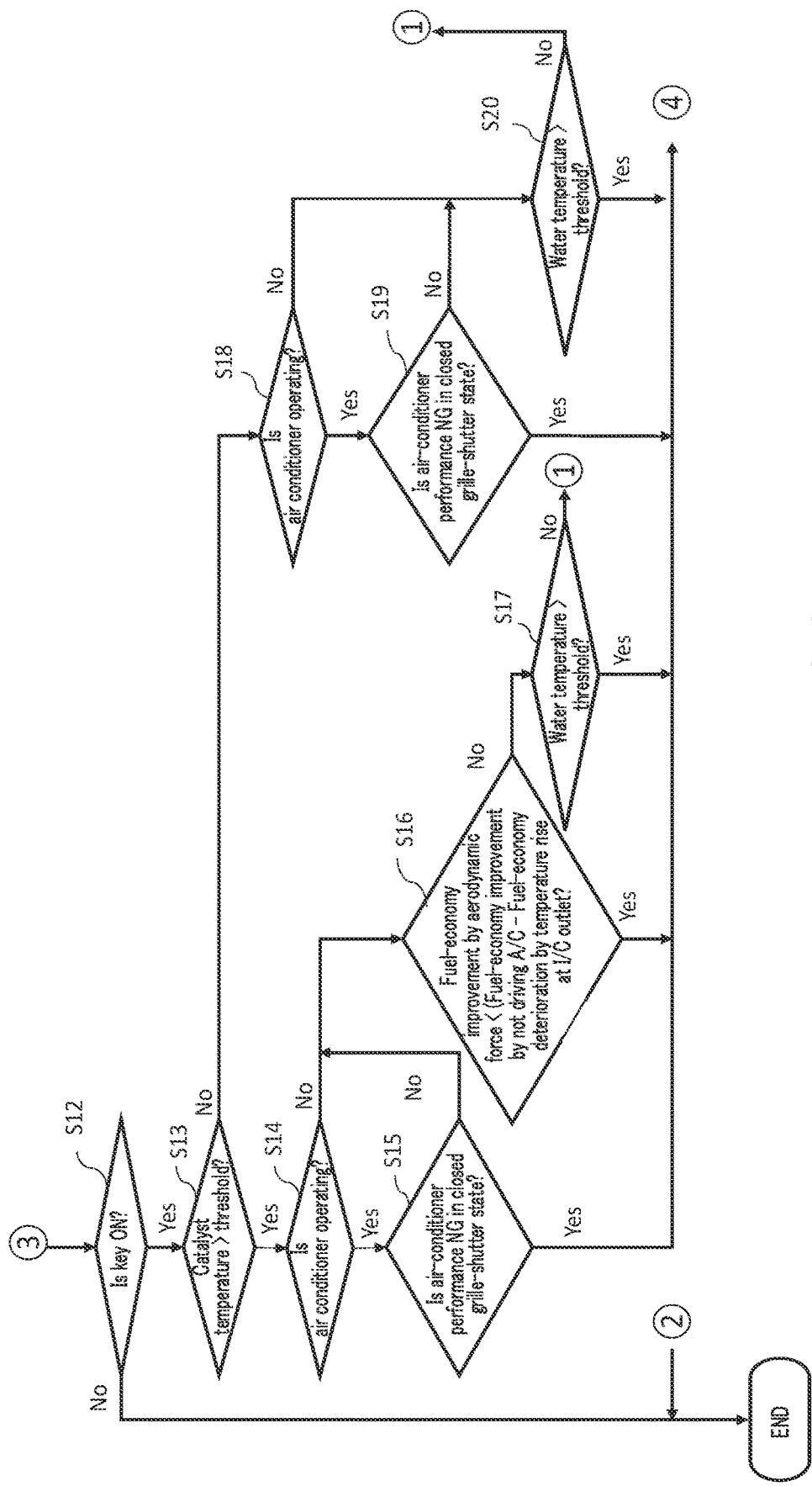
FIG. 4 is a flow diagram illustrating the operation of the grille-shutter control apparatus according to an embodiment of the present disclosure in a case where the grille shutters are open.

The operation of grille-shutter control apparatus 106 according to the embodiment of the present disclosure will be described in detail below with reference to FIGS. 3 and 4.

At first, grille shutters 21 are in a closed (CLOSED) state (S1).

Next, grille-shutter control apparatus 106 does not perform any operation when an ignition switch of the vehicle remains in the off state (S2: No). On the other hand, grille-shutter control apparatus 106 starts operation when the ignition switch of the vehicle is switched from the off state to the on state (S2: Yes). Then, logic selection section 107 judges whether or not the catalyst temperature in aftertreatment apparatus 104 indicating the temperature of the atmosphere inside exhaust pipe K1 is higher than a threshold (S3).

When the catalyst temperature is higher than the threshold (S3: Yes), logic selection section 107 selects a logic of a fuel economy priority mode for prioritizing the fuel economy performance, which is one of the opening-degree determination logics for determining the opening degree of grille shutters 21. Then, logic execution section 108 executes the logic of the fuel economy priority mode selected by logic selection section 107, and judges whether or not the air conditioner in the vehicle is operating (S4).

When the air conditioner is operating (S4: Yes), logic execution section 108 judges whether or not the closed state of grille shutters 21 causes the performance of the air conditioner not to satisfy a predetermined criterion (S5).

When the required performance of the air conditioner cannot be exhibited (the air conditioner performance is NG) (S5: Yes), logic execution section 108 opens grille shutters 21 to take more outside air into engine room 1 (S6).

Meanwhile, when the air conditioner is not operating (S4: No), or when the required performance of the air conditioner can be exhibited (the air conditioner performance is not NG) (S5: No), logic execution section 108 judges whether or not improvement in the fuel economy achieved by not driving the air conditioner that is reduced due to deterioration in the fuel economy caused by the air temperature rise at an outlet of intercooler 4 is greater than improvement in the aerodynamic force of the vehicle achieved by closing grille shutters 21 (S7).

When the improvement in the fuel economy achieved by not driving the air conditioner that is reduced due to deterioration in the fuel economy caused by the air temperature rise at the outlet of intercooler 4 is greater than the improvement in the fuel economy by the aerodynamic force (S7: Yes), logic execution section 108 opens grille shutters 21 (S6).

On the other hand, when the improvement in the fuel economy by the aerodynamic force is greater than the improvement in the fuel economy achieved by not driving the air conditioner that is reduced due to deterioration in the fuel economy caused by the air temperature rise at the outlet of intercooler 4 (S7: No), logic execution section 108 judges whether or not the water temperature of the cooling water of engine 101 is higher than a threshold (S8).

When the water temperature is higher than a threshold (S8: Yes), logic execution section 108 opens grille shutters 21 to take more outside air into engine room 1 (S6).

On the other hand, when the water temperature is equal to or lower than the threshold (S8: No), logic execution section 108 returns to the operation of step S1. As is understood, when executing the logic of the fuel economy priority mode, grille-shutter control apparatus 106 controls the opening and closing of grille shutters 21 while synthetically judging not only the effect of simply closing grille shutters 21 to improve the aerodynamic force, but also various fuel-economy varying factors that change with the opening and closing of grille shutters 21. It is thus possible to give the highest priority to the fuel economy performance of the vehicle by executing the logic of the fuel economy priority mode.

Further, when the catalyst temperature is equal to or lower than the threshold (S3: No), logic selection section 107 selects a logic of a warm-up priority mode for prioritizing warming of aftertreatment apparatus 104, which is one of the opening-degree determination logics for determining the opening degree of grille shutters 21. Then, logic execution section 108 executes the logic of the warm-up priority mode selected by logic selection section 107, and judges whether or not the air conditioner in the vehicle is operating (S9).

When the air conditioner is operating (S9: Yes), logic execution section 108 judges whether or not the closed state of grille shutters 21 causes the performance of the air conditioner not to satisfy a predetermined criterion (S10).

When the performance of the air conditioner is caused not to satisfy a predetermined condition (S10: Yes), logic execution section 108 opens grille shutters 21 to take more outside air into engine room 1 (S6).

Meanwhile, when the air conditioner is not operating (S9: No), or when the performance of the air conditioner satisfies the predetermined criterion (S10: No), logic execution section 108 judges whether or not the water temperature of the cooling water of engine 101 is higher than the threshold (S11).

When the water temperature is higher than the threshold (S11: Yes), logic execution section 108 opens grille shutters 21 to take more outside air into engine room 1 (S6).

On the other hand, when the water temperature is equal to or lower than the threshold (S11: No), logic execution section 108 returns to the operation of step S1.

As is understood, the logic of the warm-up priority mode, grille-shutter control apparatus 106 does not open grille shutters 21 until cooling air is absolutely needed in the engine room. Accordingly, the air temperature at the outlet of intercooler 4 rises, and the exhaust gas temperature rises. It is thus possible to give the highest priority to raising the temperature of the atmosphere in aftertreatment apparatus 104 by executing the logic of the warm-up priority mode.

In both the fuel economy priority mode and the warm-up priority mode, grille-shutter control apparatus 106 judges whether or not the ignition switch of the vehicle is in the on state (S12) after grille shutters 21 are opened (S6).

Grille-shutter control apparatus 106 ends the operation when the ignition switch is turned to the off state (S12: No).

On the other hand, when the ignition switch remains in the on state (S12: Yes), logic selection section 107 judges whether or not the catalyst temperature of aftertreatment apparatus 104 is higher than the threshold (S13).

When the catalyst temperature is higher than the threshold (S13: Yes), logic selection section 107 selects the logic of the fuel economy priority mode. Then, logic execution section 108 executes the logic of the fuel economy priority mode selected by logic selection section 107, and judges whether or not the air conditioner in the vehicle is operating (S14).

When the air conditioner is operating (S14: Yes), logic execution section 108 judges whether the required performance of the air conditioner cannot be exhibited when grille shutters 21 are closed (S15). Here, as compared to the threshold used in step S5, a threshold used in step S15 to judge whether the required performance of the air conditioner cannot be exhibited is set to a value allowing a greater likelihood that it is judged that the required performance of the air conditioner cannot be exhibited. That is, the condition for opening and the condition for closing grille shutters 21 are different from each other. It is thus possible to prevent grille shutters 21 from being closed at the moment when the condition for opening grille shutters 21 becomes unsatisfied. Therefore, repeated opening and closing of grille shutters 21 can be prevented.

Logic execution section 108 keeps grille shutters 21 in the open state (S6) when the required performance of the air conditioner cannot be exhibited when grille shutters 21 are in the closed state (S15: Yes).

On the other hand, when the air conditioner is not operating (S14: No), or when the required performance of the air conditioner can be exhibited (S15: No), logic execution section 108 judges whether or not improvement in the fuel economy achieved by not driving the air conditioner that is reduced due to deterioration in the fuel economy caused by the air temperature rise at the outlet of intercooler 4 is greater than improvement in the aerodynamic force of the vehicle achieved by the closed state of grille shutters 21 (S16). Here, as compared to the parameters used in step S7, parameters used for the judgement in step S16 are adjusted so that the judgement result is likely to be YES. That is, the improvement by the aerodynamic force is more likely to be judged small in step S16 than in step S7. It is thus possible to prevent grille shutters 21 from being closed at the moment when the condition for opening grille shutters 21 becomes unsatisfied. Therefore, repeated opening and closing of grille shutters 21 can be prevented.

When the improvement in the fuel economy achieved by not driving the air conditioner that is reduced due to deterioration in the fuel economy caused by the air temperature rise at the outlet of intercooler 4 is greater than the improvement in the fuel economy by the aerodynamic force (S16: Yes), logic execution section 108 keeps grille shutters 21 open (S6).

On the other hand, when the improvement in the fuel economy by the aerodynamic force is greater than the improvement in the fuel economy achieved by not driving the air conditioner that is reduced due to deterioration in the fuel economy caused by the air temperature rise at the outlet of intercooler 4 (S16: No), logic execution section 108 judges whether or not the water temperature of the cooling water of engine 101 is higher than a threshold (S17). Here, in step S17, the threshold compared with the water temperature is set to a value smaller than the threshold compared with the water temperature in step S8. As is understood, after grille shutters 21 are opened, the opening and closing of grille shutters 21 are controlled based on a condition under which grille shutters 21 are unlikely to be closed. It is thus possible to prevent a state in which the opening and closing of grille shutters 21 are repeated.

When the water temperature is higher than the threshold (S17: Yes), logic execution section 108 keeps grille shutters 21 open in order to take more outside air into engine room 1 (S6).

On the other hand, when the water temperature is equal to or lower than the threshold (S17: No), logic execution section 108 closes grille shutters 21 (S1).

Thus, grille-shutter control apparatus 106 can give the highest priority to the fuel economy performance of the vehicle by executing the logic of the fuel economy priority mode.

In addition, when the catalyst temperature is equal to or lower than the threshold (S13: No), logic selection section 107 selects the logic of the warm-up priority mode. Then, logic execution section 108 executes the logic of the warm-up priority mode selected by logic selection section 107, and judges whether or not the air conditioner in the vehicle is operating (S18).

When the air conditioner is operating (S18: Yes), logic execution section 108 judges whether or not the closed state of grille shutters 21 would cause the performance of the air conditioner not to satisfy a predetermined criterion (S19). Here, as compared to the threshold used in step S10, a threshold used in step S19 to judge whether the required performance of the air conditioner cannot be exhibited is set to a value allowing a greater likelihood that it is judged that the required performance of the air conditioner cannot be exhibited. That is, the condition for opening and the condition for closing grille shutters 21 are different from each other. It is thus possible to prevent grille shutters 21 from being closed at the moment when the condition for opening grille shutters 21 becomes unsatisfied. Therefore, repeated opening and closing of grille shutters 21 can be prevented.

When the required performance of the air conditioner cannot be exhibited (S19: Yes) when grille shutters 21 are closed, logic execution section 108 opens grille shutters 21 in order to take in more outside air to engine room 1 (S6).

On the other hand, when the air conditioner is not operating (S18: No), or when the required performance of the air conditioner can be exhibited (S19: No), logic execution section 108 judges whether or not the water temperature of the cooling water of engine 101 is higher than a threshold (S20). Here, in step S20, the threshold compared with the water temperature is set to a value smaller than the threshold compared with the water temperature in step S11. As is understood, after grille shutters 21 are opened, the opening and closing of grille shutters 21 are controlled based on a condition under which grille shutters 21 are unlikely to be closed. It is thus possible to prevent a state in which the opening and closing of grille shutters 21 are repeated.

When the water temperature is higher than the threshold (S20: Yes), logic execution section 108 opens grille shutters 21 to take more outside air into engine room 1 (S6).

On the other hand, when the water temperature is equal to or lower than the threshold (S20: No), logic execution section 108 returns to the operation of step S1.

Thus, grille-shutter control apparatus 106 is capable of giving the highest priority to raising the temperature of the atmosphere in aftertreatment apparatus 104 by executing the logic of the warm-up priority mode.

According to the present embodiment, it is possible to control the opening and closing of the grille shutter in consideration of performance other than the cooling performance of the vehicle by selecting, based on the temperature of the atmosphere inside exhaust pipe K1 of the internal combustion engine, one logic from among a plurality of opening-degree determination logics for determining the opening degree of grille shutters 21, and by executing the selected one logic to control the opening and closing of grille shutters 21.

Note that it is needless to say that the present disclosure is by no means limited to the types or arrangement of members or the number of members mentioned in the embodiment described above, and modification, such as replacement with components that bring about similar effects, can be made as appropriate to the present invention without departing from the spirit and scope of the present invention.

Specifically, in the above embodiment, the oxidation catalyst or the SCR catalyst is disposed in aftertreatment apparatus 104. However, a catalyst other than the oxidation catalyst and the SCR catalyst that is capable of decomposing NOx may be used in aftertreatment apparatus 104.

Further, in the above embodiment, the measured value by the sensor is used as the temperature of the atmosphere inside exhaust pipe K1. However, the temperature of the atmosphere may be an estimated value of the temperature of the atmosphere inside exhaust pipe K1. In this case, the estimated value of the temperature of the atmosphere inside exhaust pipe K1 may be a value obtained by dividing, by the heat capacity of aftertreatment apparatus 104, the sum value of the amount of heat that aftertreatment apparatus 104 has and the amount of heat that aftertreatment apparatus 104 receives from the exhaust gas. The amount of heat that aftertreatment apparatus 104 receives from the exhaust gas can be obtained from the flow rate of the exhaust gas, the temperature difference between at an input portion and at an output portion of the catalyst, and the specific heat or specific gravity of the exhaust gas.

As a matter of course, the logics for determining the opening degree of grille shutters 21 are not limited to the two logics described above, and various types of logics can be adopted as the logics to be selected and executed.

This application is based on Japanese Patent Application No. 2019-046467 filed on Mar. 13, 2019, the disclosure of which including the specification, drawings and abstract is incorporated herein by reference in its entirety.

INDUSTRIAL APPLICABILITY

A grille-shutter control apparatus according to the present disclosure is suitable for controlling opening and closing of a grille shutter of a vehicle in which an internal combustion engine is mounted.

REFERENCE SIGNS LIST

1 Engine room
2 Front grille
3 Condenser
4 Intercooler
5 Radiator
21 Grille shutter
100 Vehicle
101 Engine
102 Air cleaner
103 Turbocharger
104 Aftertreatment apparatus
105 EGR apparatus
106 Grille-shutter control apparatus
107 Logic selection section
108 Logic execution section
K1 Exhaust pipe

What is claimed is:

1. A grille-shutter control apparatus that controls opening and closing of a grille shutter of a vehicle in which an internal combustion engine is mounted, the grille-shutter control apparatus comprising a processor configured to:
    select a logic from among a plurality of opening-degree determination logics that are stored in a memory, based on a temperature of an atmosphere inside an exhaust pipe of the internal combustion engine or a temperature of a catalyst inside an aftertreatment apparatus of the internal combustion engine, the plurality of opening-degree determination logics being for determining an opening degree of the grille shutter; and
    control the opening and closing of the grille shutter by executing the selected logic selected by the processor.

2. The grille-shutter control apparatus according to claim 1, wherein
    the plurality of opening-degree determination logics include a first logic for giving a highest priority to raising the temperature of the atmosphere, and a second logic for giving the highest priority to fuel economy performance of the vehicle.

3. The grille-shutter control apparatus according to claim 2, wherein
    the processor selects the first logic when the temperature of the atmosphere is equal to or lower than a threshold, or selects the second logic when the temperature of the atmosphere is higher than the threshold.

4. The grille-shutter control apparatus according to claim 1, wherein,
    when the selected logic is executed in a state where the grille shutter is open, the processor controls the opening and closing of the grille shutter based on a condition under which a state of the grille shutter is less likely to be changed than when the selected logic is executed in a state where the grille shutter is closed.

* * * * *